(12) United States Patent
Moreno et al.

(10) Patent No.: US 10,198,295 B2
(45) Date of Patent: Feb. 5, 2019

(54) MECHANISM FOR CONTROLLED SERVER OVERALLOCATION IN A DATACENTER

(71) Applicant: University of Leeds, Leeds (GB)

(72) Inventors: Ismael Solis Moreno, Leeds (GB); Paul Michael Townend, Leeds (GB); Peter Michael Garraghan, Leeds (GB); Jie Xu, Leeds (GB)

(73) Assignee: University of Leeds, Leeds, West Yorkshire (GB)

( * ) Notice: Subject to any disclaimer, the term of this patent is extended or adjusted under 35 U.S.C. 154(b) by 167 days.

(21) Appl. No.: 15/310,020

(22) PCT Filed: May 19, 2015

(86) PCT No.: PCT/GB2015/051466
§ 371 (c)(1),
(2) Date: Nov. 9, 2016

(87) PCT Pub. No.: WO2015/177532
PCT Pub. Date: Nov. 26, 2015

(65) Prior Publication Data
US 2017/0139754 A1 May 18, 2017

(30) Foreign Application Priority Data
May 21, 2014 (GB) .................... 1409056.7

(51) Int. Cl.
*G06F 9/50* (2006.01)
*G06F 9/48* (2006.01)
*H04L 12/911* (2013.01)

(52) U.S. Cl.
CPC .......... *G06F 9/5044* (2013.01); *G06F 9/4893* (2013.01); *G06F 9/5038* (2013.01);
(Continued)

(58) Field of Classification Search
CPC ................................................. G06F 9/5044
See application file for complete search history.

(56) References Cited

U.S. PATENT DOCUMENTS

| 2010/0082320 A1 | 4/2010 | Wood et al. |
| 2011/0131431 A1 | 6/2011 | Akers et al. |

(Continued)

FOREIGN PATENT DOCUMENTS

| WO | WO 2011/076486 A1 | 6/2011 |
| WO | WO 2014/047073 A1 | 3/2014 |

OTHER PUBLICATIONS

Urgaonkar, B., et al. "Resource Overbooking and Application Profiling in Shared Hosting Platforms," Proceedings of the Fifth Symposium on Operating Systems Design and Implementation (OSDI '02) Nov. 2002, (18 pages).
(Continued)

*Primary Examiner* — Charlie Sun
(74) *Attorney, Agent, or Firm* — Hamilton, Brook, Smith & Reynolds, P.C.

(57) ABSTRACT

A method of controlling a datacenter (1), for example a cloud datacenter, and a computer management system (3) for managing a datacenter comprising a plurality of servers (2) configured to execute a plurality of jobs is provided. The method comprises receiving a request to execute a job from a user (4), determining an allocated server (2) on which to execute the job, and executing the job on the allocated server (2). The determining the allocated server (2) on which to execute the job comprises: classifying the job according to its resource requirement, selecting a subset of the servers (2) that fulfill the resource requirements of the job, determining the allocated server (2) that can execute the job with a favorable energy efficiency, wherein a total resource estimate for all jobs running on the server (2) from time to time exceeds the resources of at least one of the servers (2).
(Continued)

Accordingly, the datacenter (1) may over allocate the capacity of the physical servers (2), to overcome the overestimation of required resources by users (4).

16 Claims, 7 Drawing Sheets

(52) U.S. Cl.
CPC ............ *G06F 9/5094* (2013.01); *H04L 47/70* (2013.01); *Y02D 10/22* (2018.01)

(56) References Cited

U.S. PATENT DOCUMENTS

| | | |
|---|---|---|
| 2011/0161696 A1 | 6/2011 | Fletcher |
| 2012/0030356 A1 | 2/2012 | Fletcher |
| 2013/0111468 A1 | 5/2013 | Davis et al. |
| 2014/0006534 A1 | 2/2014 | Jain et al. |
| 2015/0227397 A1* | 8/2015 | Gogula ................. G06F 9/5094 718/104 |
| 2015/0242234 A1* | 8/2015 | Harris ................... G06F 9/5011 718/1 |
| 2016/0026590 A1* | 1/2016 | Park ........................ G06F 1/206 710/316 |

OTHER PUBLICATIONS

Notification of Transmittal of the International Search Report and the Written Opinion of the International Searching Authority for PCT/GB2015/051466, "A Mechanism for Controled Server Overallocation in a Datacenter," dated Sep. 16, 2016 (15 pages).

\* cited by examiner

MECHANISM FOR CONTROLLED SERVER OVERALLOCATION IN A DATACENTER

RELATED APPLICATIONS

This application is the U.S. National Stage of International Application No. PCT/GB2015/051466, filed on May 19, 2015, which designates the U.S., published in English, and claims priority under 35 U.S.C. §§ 119 or 365(c) to Great Britain Application No. 1409056.7, filed on May 21, 2014. The entire teachings of the above applications are incorporated herein by reference.

FIELD

The present invention relates to a system and method for managing a datacentre and to a datacentre incorporating an overload management function.

Particularly, the present invention relates to a system and method for managing resource overallocation in a virtualised datacentre including the estimation of the optimal overallocation ratio and an overload management function.

BACKGROUND

A cloud datacentre offers a remote user the possibility of purchasing computing resource to be used by submitting computing jobs to the datacentre for computing by the datacentre.

In the cloud datacentre, a user submits a job that he wishes to be executed. The user may specify in advance the priority of the job and a resource estimate, which details the amount of resources the user expects that the job will consume, in terms of CPU time, memory usage and the like.

The cloud datacentre executes the job and returns the results to the user.

Each job is encapsulated in a virtual container—such as a virtual machine—and one or more jobs are co-located on a physical server. Each job may have placement constraints which limit the set of physical servers to which the job may be allocated. For example, the constraints may specify a particular machine architecture, a particular operating system, a particular physical location or a particular set of security constraints.

As the quantity of virtual containers co-located on a physical server increases, so too does the competition between the virtual containers for the physical resources of the server. High competition may lead to frequent swapping of jobs, and/or inefficient use of resources. This phenomenon, known as performance interference, may have an adverse effect on the speed of execution of a job running in a virtual container.

It has been found that users typically overestimate the amount of resource required, which may be a result of a desire to avoid the job being delayed by a lack of allocated resource, or because of a lack of accurate understanding about the actual requirements of their jobs during runtime. This produces a significant amount of idle resource and affects the energy efficiency of datacentres. To reduce these negative effects, a datacentre manager may manually overallocate the available resources in the knowledge that the amount of actually utilised resource should not exceed the capacity of physical servers. Overloading the capacity of physical servers can result in performance degradation of co-located jobs, therefore affecting the satisfaction of customers.

It is an object of the present invention to address the abovementioned disadvantages.

SUMMARY

According to the present invention there is provided an apparatus and method as set forth in the appended claims. Other features of the invention will be apparent from the dependent claims, and the description which follows.

According to an aspect of the present invention there is provided a method of controlling a datacentre comprising a plurality of servers to execute a plurality of jobs, the method comprising:
  receiving a request to execute a job from a user;
  determining an allocated server on which to execute the job; and
  executing the job on the allocated server,
  wherein the determining comprises:
  classifying the job according to its resource requirement;
  selecting a subset of the servers that fulfil the resource requirements of the job;
  determining the allocated server that can execute the job with a favourable energy efficiency,
  and wherein a total resource estimate for all jobs running on the server from time to time exceeds the resources of at least one of the servers.

The plurality of jobs may be a plurality of heterogeneous jobs.

The request to execute a job from a user may include a resource estimate. The resource estimate may give an indication, or may specify, the resource requirements of the job.

The favourable energy efficiency may be a highest energy efficiency, which may be based on the speed at which a job can be completed, which is related to the amount of power used and hence the energy efficiency.

The determining the server which can execute the job with the highest energy efficiency may comprise:
  calculating an overallocation rate, OAR, of each server in the subset of servers;
  determining if each server has available resources to execute the job given the OAR;
  determining the estimated energy efficiency of each server if the job is assigned to the server; and
  executing the job on the server which the available resources and has the highest estimated energy efficiency.

The calculating the OAR may comprise: calculating an overselling profit rate of the server; establishing a category of the user; calculating the OAR from a statistical distribution describing overestimation patterns of the category of the user, using the overselling profit rate (P).

The overselling profit rate may be calculated according to the formula:

$$P = \frac{R}{R+C}$$

wherein R is a difference in energy efficiency (EE) caused by allocating the job to the server, and wherein C is the EE after allocation multiplied by the estimated change in EE.

The classifying the job may comprise: training a decision tree classifier on a training set of historical tracelog data; and classifying the job with the decision tree classifier.

The selecting the subset of the servers may comprise: calculating the spatial distance between a set of server features and a set of job constraints, and selecting the servers having a similarity equal to or greater than a predetermined minimum similarity value.

The method may further comprise: detecting an overload event in at least one of the plurality of servers; resolving the detected overload event by evicting, pausing or migrating jobs having a lowest priority and a shortest running time.

The estimated change in EE may be calculated using an estimated performance interference.

The estimated performance interference may be an estimated aggregate of a performance interference produced by the plurality of jobs co-located on the server, based on a class of each job located on the server.

According to another aspect of the invention there is provided a computer management system, CMS, for managing a computer datacentre comprising a plurality of servers, each comprising at least one virtual container, VC, the CMS comprising:
- a co-ordinator service module configured to receive a request to execute a job from a user, to control the CMS to determine a server on which the job will be executed and to control the CMS to execute the job;
- a job classification service module operable to classify the job according to its resource requirements;
- a resource description reasoner module operable to select a subset of servers which fulfil a set of constraints of the job;
- a dynamic status host monitor module operable to record the status of each server in the datacentre;
- a datacentre communication module operable to communicate with the plurality of servers, and
- an overallocation policy service module operable to determine the server which can execute the job with a favourable energy efficiency from the subset of servers and the class of the job.

The system may additionally comprise a user classification service module operable to establish a category of the user and determine a statistical distribution describing overestimation patterns of the category of the user.

The system may additionally comprise an overload manager operable to detect an overload event in at least one of the plurality of servers and resolve the detected overload event by evicting, pausing or migrating jobs having a lowest priority and a shortest running time.

The overallocation policy service may be operable to: calculate an overallocation rate, OAR, of each server in the subset of servers; determine if each server has available resources to execute the job given the OAR; determine the estimated energy efficiency of each server if the job is assigned to the server.

The overallocation policy service may be further operable to: calculate an overselling profit rate of the server; calculate the OAR from the statistical distribution describing overestimation patterns of the category of the user, using the overselling profit rate.

The overallocation policy service may be operable to calculate the overselling profit rate according to the formula:

$$P = \frac{R}{R+C}$$

wherein R is a difference in energy efficiency (EE) caused by allocating the job to the server, and wherein C is the EE after allocation multiplied by the estimated change in EE.

The overallocation policy service may calculate the estimated change in EE using an estimated performance interference.

The estimated performance interference may be an estimated aggregate of a performance interference produced by the plurality of jobs co-located on the server, based on a class of each job located on the server.

The resource description reasoner may be operable to: calculate a similarity level between a set of server features and a set of job constraints, and select the servers having the similarity level equal to or greater than a predetermined minimum similarity value.

According to another aspect of the present invention there is provided a computer datacentre comprising a plurality of servers, each comprising at least one virtual container, VC, wherein the computer datacentre incorporates a computer management system, CMS, of the preceding aspect.

According to another aspect of the present invention there is provided a computer-readable storage medium having computer-executable components which when executed cause a computing device to perform the method of the first aspect.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION

Figure 1A:
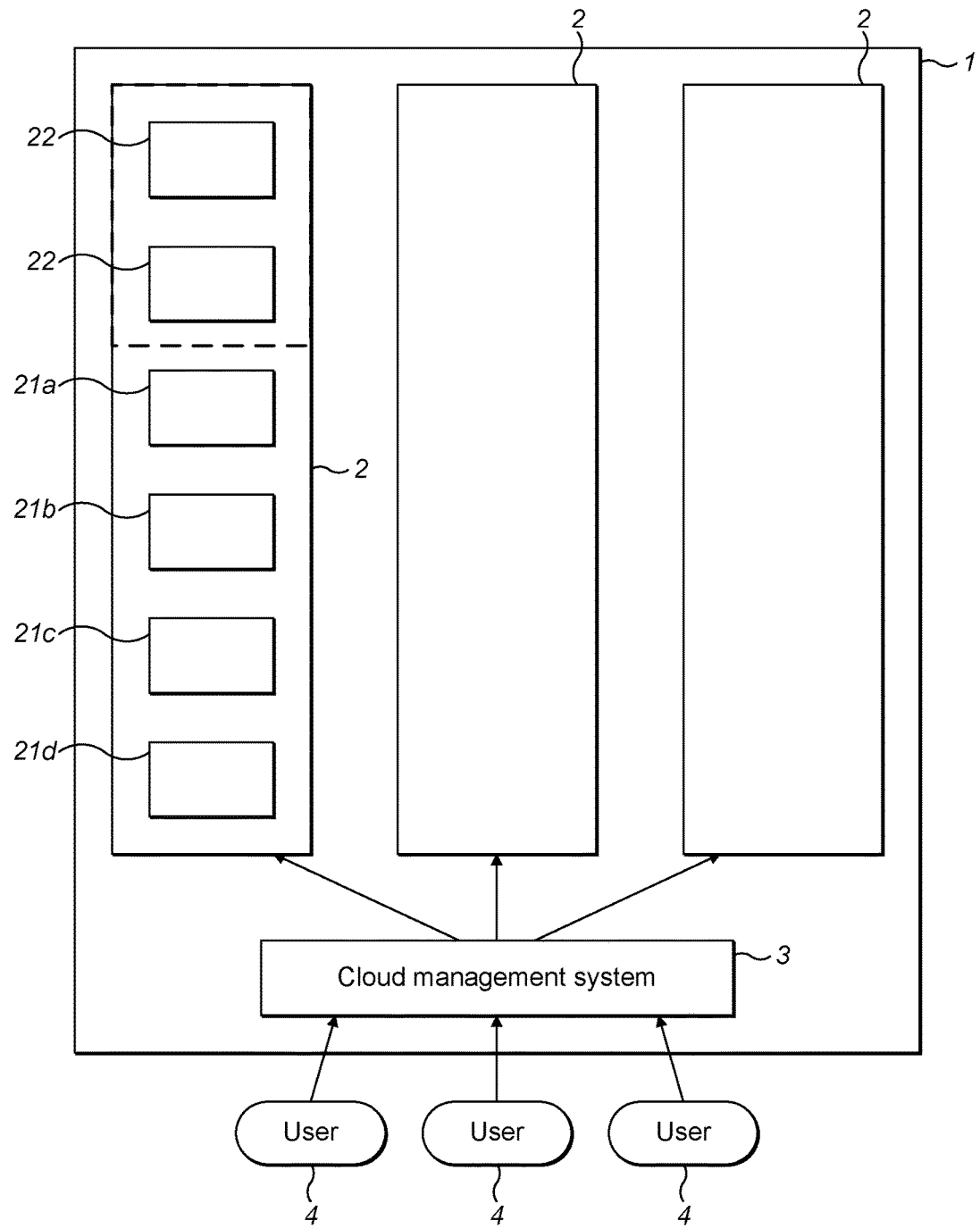
FIG. 1a is a schematic diagram which illustrates the structure of a cloud-computing datacentre according to an exemplary embodiment.

FIG. 1a shows a cloud datacentre 1, comprising a plurality of server computers 2 and a Cloud Management System (CMS) 3.

The cloud datacentre 1 may correspond to a plurality of servers 2 located in the same building or on the same site. Alternatively the cloud datacentre 1 may instead comprise a plurality of servers widely dispersed and connected by a Wide Area Network such as the Internet.

Each of the plurality of servers 2 may comprise at least one central processing unit (CPU) (not shown), a memory (not shown) and a storage (not shown). Each of the plurality of servers 2 further comprises a virtual container manager (not shown) or Hypervisor (not shown). The virtual container manager (not shown) or Hypervisor (not shown) may be hosted by an Operating System (OS) (not shown), for example Linux or Windows, or may instead run directly on the hardware of the server 2.

Furthermore, each of the plurality of servers 2 comprises one or more virtual containers 21, hereinafter referred to as VCs 21.

Each VC 21 is a virtual software-based emulation of a computer, which provides a simulated computer environment operable to execute at least one software program as if it was a physical computer.

The provision of a plurality of VCs 21 on a given server 2 allows for parallel execution of jobs, and may provide an efficient means of sharing computational resources such as CPU and memory.

A VC 21 may be allocated a fixed portion of the resources of the server which may not be exceeded by any software running in the VC 21. For example, a server 2 may comprise four VCs 21a-21d, each allocated 25% of the servers resources.

It will be understood by one skilled in the art that the allocation of a server's resources may not be uniform, and, for example, a VC 21a may be allocated a greater percentage of the resources of server 2 than a VC 21b. It will be further understood by one skilled in the art that the consumption rate of the resources may be variable over time.

In a cloud datacentre in accordance with the prior art, a user 4 may submit a job to the CMS 3 which he wishes to be executed by the datacentre 1. The user 4 may specify in advance the priority of the job and a resource estimate, which details the amount of resources the user expects that the job will consume, in terms of CPU time, memory usage and the like.

In accordance with this estimation, the CMS 3 allocates the job to an appropriate server 2 by creating a VC 21 on the server 2 to execute the job. The allocation may be based at least partially on the priority and resource estimate.

A common problem with relying on the resource estimate is that users very often significantly overestimate the resources required by a job. A recent study shows that over 90% of jobs are overestimated, and in some cases as much as 98% of the resources allocated are wasted.

In order to solve this problem, the CMS 3 may simply assume that the resource estimate is an overestimate, and overallocate the resources of a server 2 accordingly.

FIG. 1a also shows overallocated VCs 22. The resources allocated to the VCs 21 and the overallocated VCs 22 exceeds the actual resources of the server 2. However, it is simply assumed that, due to the gross overestimation by the user 4, the server 2 is unlikely to run out of physical resources.

The ratio of overallocated resources to actual resources is referred to as the Overallocation Rate (OAR) of a server:

$$OAR = \frac{allocated\_resources}{actual\_resources}$$

In prior art cloud datacentres, for example those managed by OpenStack® or Apache CloudStack™, the OAR is set uniformly for all servers, and is a fixed value changeable only by a system administrator. The OAR may be calculated based on spreadsheet models or rules-of-thumb.

In contrast, the CMS 3 is operable to vary the OAR for at least one server 2 independently of any other server. The CMS 3 is operable to vary the OAR based on at least one of: performance interference effects, customer overestimation patterns and energy efficiency metrics.

Figure 1B:
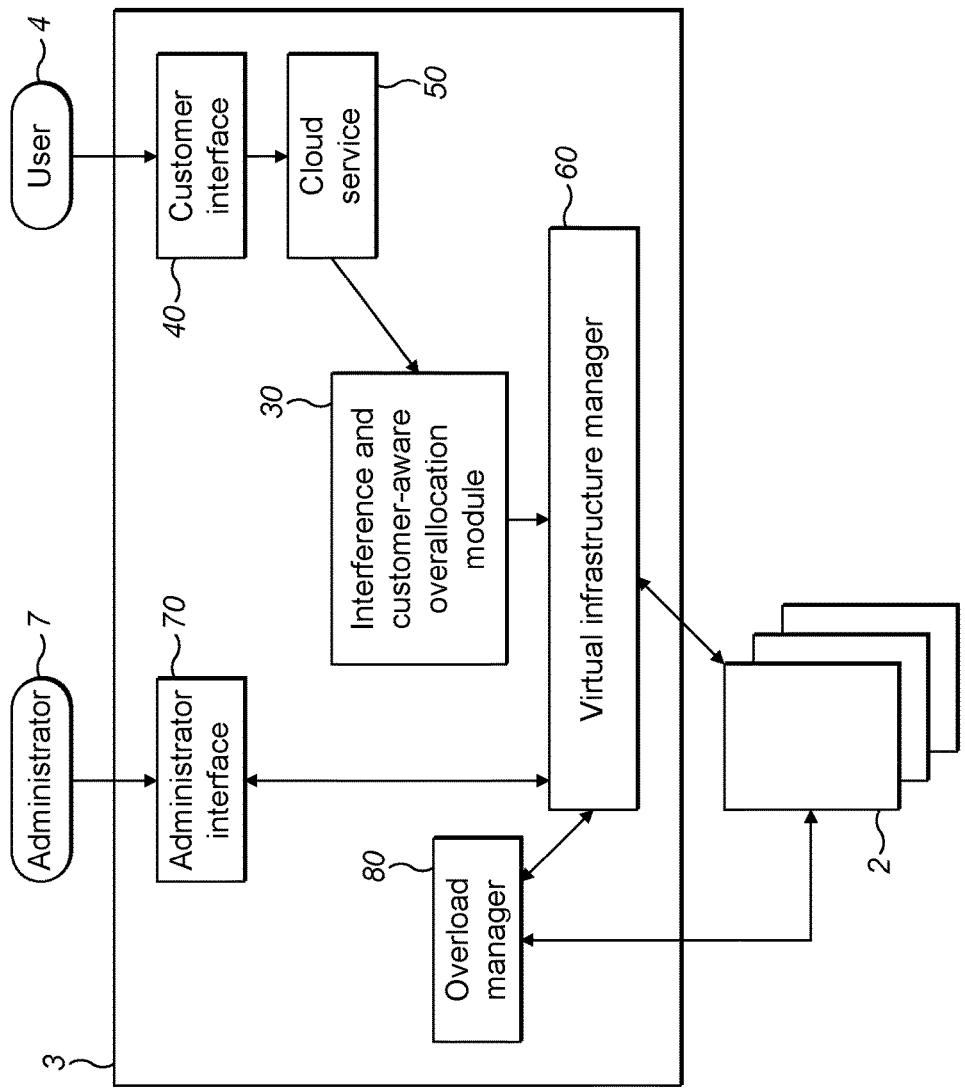
FIG. 1b is a block diagram which illustrates the structure of a cloud management system according to an exemplary embodiment.

FIG. 1b is a block diagram illustrating the CMS 3 according to an exemplary embodiment of the invention.

The CMS 3 comprises an administrator interface 70, a customer interface 40, a cloud service 50, an interference and customer-aware overallocation module (ICAO) 30 and a virtual infrastructure manager 60.

The customer interface 40 is operable to communicate with at least one user 4, and to receive job requests therefrom.

The administrator interface 70 is operable to communicate with an administrator 7. The administrator 7 may communicate with the administrator interface 70, for example in order to update and/or modify permissions, access rights, quotas and the like.

The virtual infrastructure manager 60 transmits information to and receives information from the cloud datacentre 1, the plurality of servers 2 located therein and the plurality of VCs 21 located thereon. This may include control information for controlling the servers 2 and VCs 21, and status information on the status of the servers 2 and VCs 21.

The virtual infrastructure manager is operable to manage the plurality of servers 2 and the VCs 21 located thereon. Particularly, the virtual infrastructure manager 60 may create new VCs 21 on the plurality of servers 2, and execute a job in each VC 21.

The cloud service 50 provides an interface between the job requests from users 4 and the other modules of the CMS 3. The cloud service 50 is operable to receive job requests from users 4, and format those requests so that they can be interpreted by the other modules of the CMS 3.

The ICAO 30 is operable to choose the most efficient server 2 on which to execute the job. The ICAO 30 is further operable to request that the virtual infrastructure manager 3 creates a VC 21 on the most efficient server 2, and that the CMS 3 executes the job thereon. The ICAO 30 is described in more detail below with reference to FIG. 2.

Figure 2:
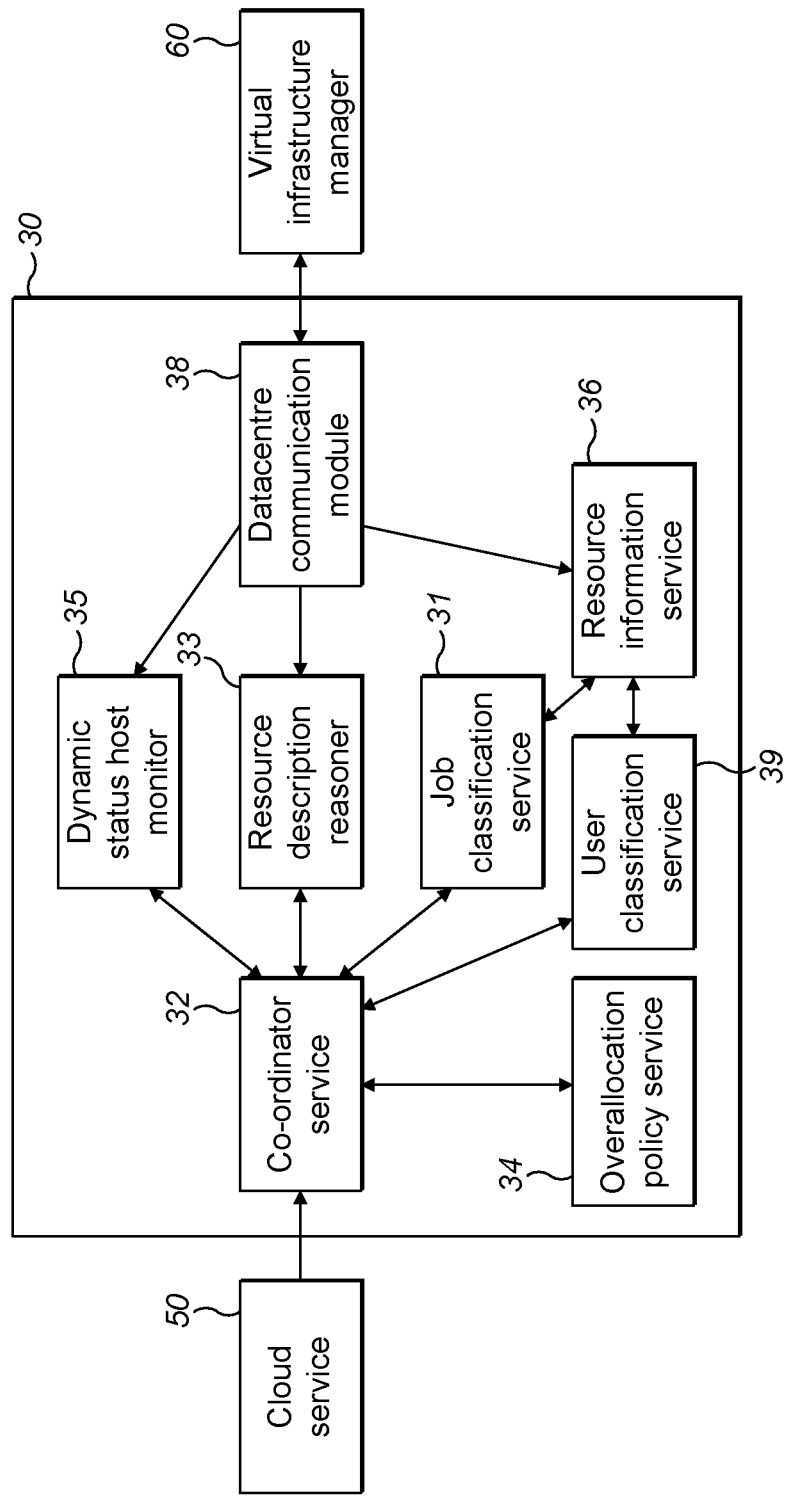
FIG. 2 is a block diagram of an interference and customer-aware overallocation module according to an exemplary embodiment.

FIG. 2 shows a detailed view of the ICAO 30 according to an exemplary embodiment.

The ICAO 30 includes a job classification service (JCS) 31, a co-ordinator service (COS) 32, a resource description reasoner (RDR) 33, an overallocation policy service (OAPS) 34, a dynamic status host monitor (DSM) 35, a resource information service (RIS) 36 and a datacentre communication module (DCM) 38.

The DCM 38 is operable to communicate with the virtual infrastructure manager in order to transmit information to and receive information from the cloud datacentre 1, the plurality of servers 2 located therein and the plurality of VMs 21 located thereon.

The COS 32 is operable to receive at least one request from at least one user 4 to execute a job in the cloud datacentre 1, via the cloud service 50. The COS 32 controls the other modules of the ICAO 30 in order to appropriately select the most efficient server 2 on which to execute the job. The COS 32 subsequently requests that the CMS 3 creates a VC 21 on the most efficient server 2, and that the CMS 3 executes the job thereon.

The job may correspond to a single software program or a plurality of software programs. The jobs are not restricted to any particular type of software program, and may be heterogeneous in terms of both their purpose and their resource consumption.

The RIS 36 provides an interface to access and exploit utilisation pattern data collected from monitoring the resource utilisation patterns of the plurality of servers 2 to the JCS 31. The data is collected from the plurality of servers 2 via the datacentre communication module 38. The data may be collected by a monitor (not shown), such as Libvirt API, which allows resource monitoring of VCs 21.

The RIS 36 may further comprise a Resource Monitoring Database (not shown) in order to store the resource utilisation patterns.

The JCS 31 receives data describing the characteristics of a job, classifies the job according to its characteristics, and transmits the classification to the COS 32. The characteristic data may comprise information on task length, CPU time and memory required.

The JCS 31 classifies the job as small, medium or large. It will be understood that the JCS 31 may alternatively classify the job into either more or fewer classes. The number of classes used may depend upon the workload characteristics of the datacentre 1.

The JCS 31 uses a decision tree classifier in order to classify the job. The decision tree classifier is trained using a dataset of historical datacentre tracelog information. The historical information used is the utilisation pattern data provided by the RIS 36.

It will be understood that any appropriate algorithm may be used to classify the jobs, including any supervised or semi-supervised machine-learning algorithm, or a set of manually formulated rules.

In an exemplary embodiment, the ICAO 30 also comprises a user classification service (UCS) 39.

The UCS 39 may use a statistical model to determine the minimum overestimation patterns of co-existing users 4. The statistical model comprises a plurality of distributions, each distribution corresponding to a category of user 4.

The categories of users 4 are established by an analysis of historical job and user data. In an exemplary embodiment, k-means clustering of historical data is used to establish the categories of users 4.

The historical data comprises information relating to the submission rate, estimated CPU usage and estimated memory usage of jobs owned by a user 4. It also comprises information relating to the actual CPU usage and actual memory usage of a jobs owned by a user 4. The historical data may be provided by the RIS 36.

It will be understood that other algorithms, such as supervised or semi-supervised machine-learning algorithms, or a set of manually formulated rules may be used to categorise the user data. The algorithm then selects the user category based on the job characteristics.

The overestimation distributions of each user category may differ, and may comprise distributions such as the generalised extreme value, logistic, normal, Wakeby or 3-parameter lognormal. The UCS 39 is operable to apply A Goodness of Fit test to the data corresponding to each user category in order to establish the appropriate distribution for each user category.

The categories of user and/or the distributions corresponding to them are recalculated on a periodic basis. The distributions can be updated dynamically as further data is generated.

The RDR 33 preselects a subset of servers 2 that fulfil the constraints of the incoming job. The constraints may be the aforementioned characteristic data, and/or any other user-specified constraints. The RDR 33 comprises a case library (not shown) which maintains a library of all the servers 2 in the datacentre 1, and their features.

The RDR 33 takes the server features $F=\{f_2, f_3, \ldots, f_n\}$ described in the library and the set of job constraints $C=\{c_1, c_2, c_3, \ldots, c_n\}$ and determines their similarity by using the retrieval phase of Case-Based Reasoning (CBR).

CBR is an artificial intelligence technique wherein a library of past cases is directly used to solve a problem, in contrast to machine-learning techniques in which rules or generalisations are formed from training data and then subsequently used to solve problems. CBR is a four step process: (1) retrieve the most similar case or cases to the current problem from the case library; (2) reuse the retrieved case(s) to try and solve the current problem; (3) revise and adapt the proposed solution if necessary; (4) retain the final solution as part of a new case.

The RDR 33 returns the list of preselected servers 2 that match the requirements. Alternatively, the RDR 33 may return a list of servers 2 that have a similarity level equal to or greater than a predetermined minimum similarity value. The minimum similarity value is set by the system administrator, and may be adjusted by the system administrator in order to enforce the fulfilment of both soft and hard constraints.

It will be understood that any suitable algorithm for preselecting the servers 2 may be used, and that any similarity calculation may be employed.

The DSM 35 records the status of each server 2 in the datacentre 1. Every time a VC 21 is deployed or removed from a specific server 2, the characteristics of that server 2 are determined by the DSM 35 and then stored. The DSM 35 is operable to transmit data about the characteristics of a server 2 to the COS 32, when requested by the COS 32. The characteristics of a server 2 may be stored using a Hash Map structure to enable indexed searches of the server list.

The characteristics determined by the DSM 35 may include the resource availability, energy efficiency and a Combined Interference Score (CIS), all of which are described below.

The resource availability A for a server s may be determined for each resource r={CPU,memory,disk,bandwidth} based upon the maximum server availability Max(r,s) and the sum of current allocation for each deployed VC Alloc(r,vc). The maximum server availability Max(r,s) takes into account the physical capacity of the server s, as well as the estimated OAR for the server s. The resource availability A may be calculated according to the following formula:

$$A(r, s) = \text{Max}(r, s) - \sum_{i=1}^{n} Alloc(r, vc_i)$$

The energy efficiency EE for a server s is calculated as the ratio of the work being computed w, which may be measured in terms of Millions of Instructions, and the used power P(u) in watts. The energy efficiency may be calculated according to the following formulae:

$$EE(s) = \frac{w}{P(u)}$$

$$P(u) = \Delta Pow \cdot u + (P(\alpha) - \Delta Pow \cdot \alpha)$$

$$\Delta Pow = \frac{P(\beta) - P(\alpha)}{\beta - \alpha}$$

where u is the system utilisation, $\alpha$ and $\beta$ are the lower and upper utilisation levels according to a predetermined server profiling process.

The CIS is a measure of the interference between a plurality of VCs 21a-d on a single physical server 2. As the number of VCs 21 on a given server 2 increases, so too does the competition between the VCs 21 for the physical resources of the server 2. High competition may lead to frequent swapping of jobs, and/or inefficient use of resources. Accordingly, performance interference may have an adverse effect on the speed of execution of a job running in a VC 21.

CIS is calculated according to the formula:

$$CIS(s) = \sum_{i=1}^{n} \frac{P_i - B_i}{B_i}$$

Where n is the total number of VCs co-allocated in the server s, $P_i$ is the performance of the $VC_i$ when combined with the other VCs, and $B_i$ is the performance of the $VC_i$ when running in isolation.

The COS 32 receives the information from the JCS 31, RDR 33 and DSM 35, and provides this information to the OAPS 34. The COS 32 may also receive information from the UCS 39 and provide this information to the OAPS 34. The OAPS 34 is operable to determine a suitable server 2 for the allocation of the job requested by the user 4.

The OAPS 32 calculates the server 2 with the highest expected energy efficiency in relation to the amount of overallocated resources, and allocates the job to this server 2.

Furthermore, the OAPS 32 is operable to determine a suitable overallocation rate (OAR) for a server 2. The OAR may be calculated with reference to a statistical model describing the rate at which particular types of clients overestimate their required resources.

The algorithm used by the OAPS 32 for calculating the OAR is described in detail below, with reference to FIGS. 3a, 3b and 4.

Figure 3A:
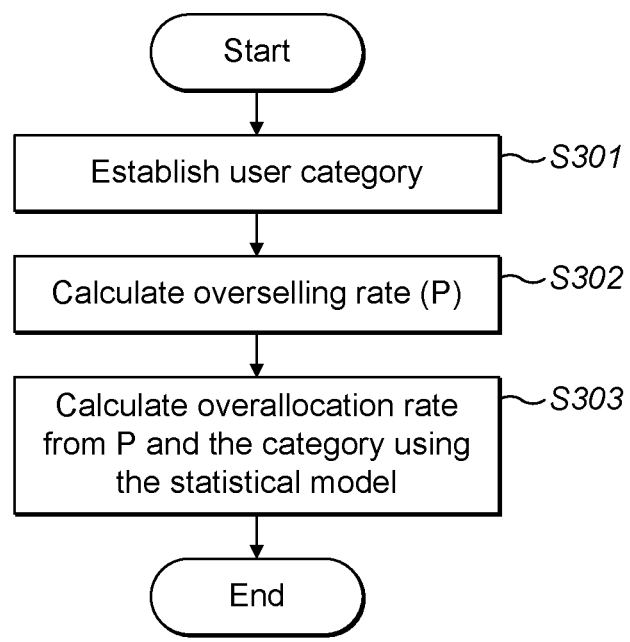
FIG. 3a is a flowchart detailing a method of calculating the Overallocation Rate according to an exemplary embodiment.
Figure 3B:
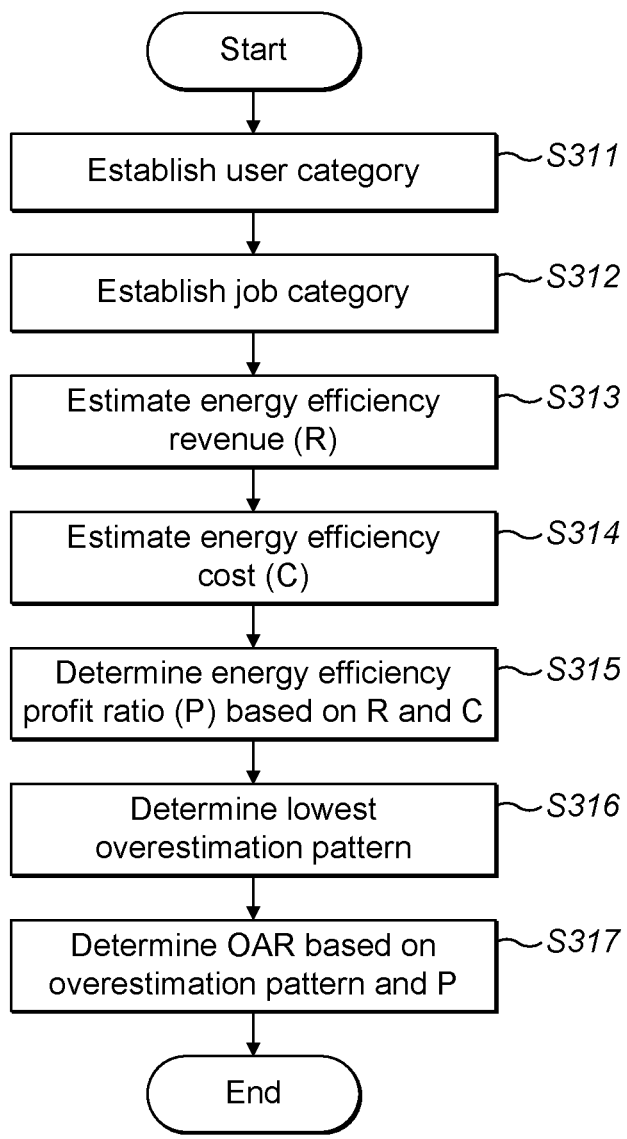
FIG. 3b is a flowchart detailing a method of calculating the Overallocation Rate according to an exemplary embodiment.

FIG. 3a is a flowchart showing a method of calculating the OAR of a given server 2.

Firstly, in step S301, the UCS 39 is used to determine the user category. Secondly, in step S302, the algorithm calculates an overselling profit rate P. Finally, in step S303, the algorithm calculates the overallocation rate from P and the user category.

The method of calculating the OAR is explained in more detail below with reference to FIG. 3b.

Firstly, in step S311, the UCS 39 is used to determine the user category.

Secondly, in step S312, the JCS 31 is used to determine the class of the job.

Thirdly, in step S313, the algorithm calculates an estimate of the energy efficiency revenue R associated with overselling. R is defined to be the difference in energy efficiency (EE) caused by allocating the job to a given server 2:

R=EE(afterAllocation)−EE(current)

Wherein EE is calculated according to the same formula defined above with reference to the functions of the DSM 35.

Fourthly, in step S314, the algorithm calculates an estimate of the energy efficiency cost C associated with overselling.

C is the EE after allocation multiplied by the estimated change in EE (EstΔEE). The estimated change in EE (EstΔEE) takes into account the estimated performance interference, measured in terms of CIS (EstCIS):

C=EE(afterAllocation)*EstΔEE

EstΔEE=EstΔEE(EstCIS)

EstCIS is the estimate of the CIS, should the job be allocated to the server. Particularly, the EstCIS is an estimate of the aggregated interference produced by all the jobs co-located on a particular server 2, based on the class of each job located on the server 2. The class of each job may be established by the JCS 31.

In an exemplary embodiment, EstCIS is derived by measuring the CIS associated with each possible pair-combination of job classes. Given three job classes representing small, medium and large jobs, CIS is measured for the following pair-combinations: (small, small), (small, medium), (small, large), (medium, medium), (medium, large), (large, large). EstCIS for a particular server 2 is then calculated from these pair-combination CIS measurements.

EstCIS may be calculated by a simple addition of the relevant pairs. For example, the EstCIS of a server having a large job, a small job and a medium job may be calculated by the addition of the measured CIS associated with the pair combinations (small, large), (small, medium) and (medium, large).

It will be understood by one skilled in the art that any suitable algorithm may be alternatively employed for estimating the CIS based on the characteristics of the jobs co-located on a particular server 2.

Subsequently, in step S315, the algorithm calculates an overselling profit rate P. P is calculated according to the following formula:

$$P = \frac{R}{R+C}$$

The profit rate P is subsequently used as a parameter in a statistical model, in order to calculate the OAR for the server 2.

Subsequently, in step S316, the UCS 39 is used to determine the minimum overestimation pattern considering the user category of all co-located and new users.

Finally, in step S317, the OAR is calculated according to the following formula:

OAR=1+inverseCDF(minOverestimation,P)

where inverseCDF is the inverse cumulative distribution function of the distribution of the minimum user overestimation pattern.

It will be understood that in alternative exemplary embodiments, user classification by the UCS 39 may be omitted from the calculation of the OAR. In these alternative exemplary embodiments, a single user category may instead be assumed for all users.

Figure 4:
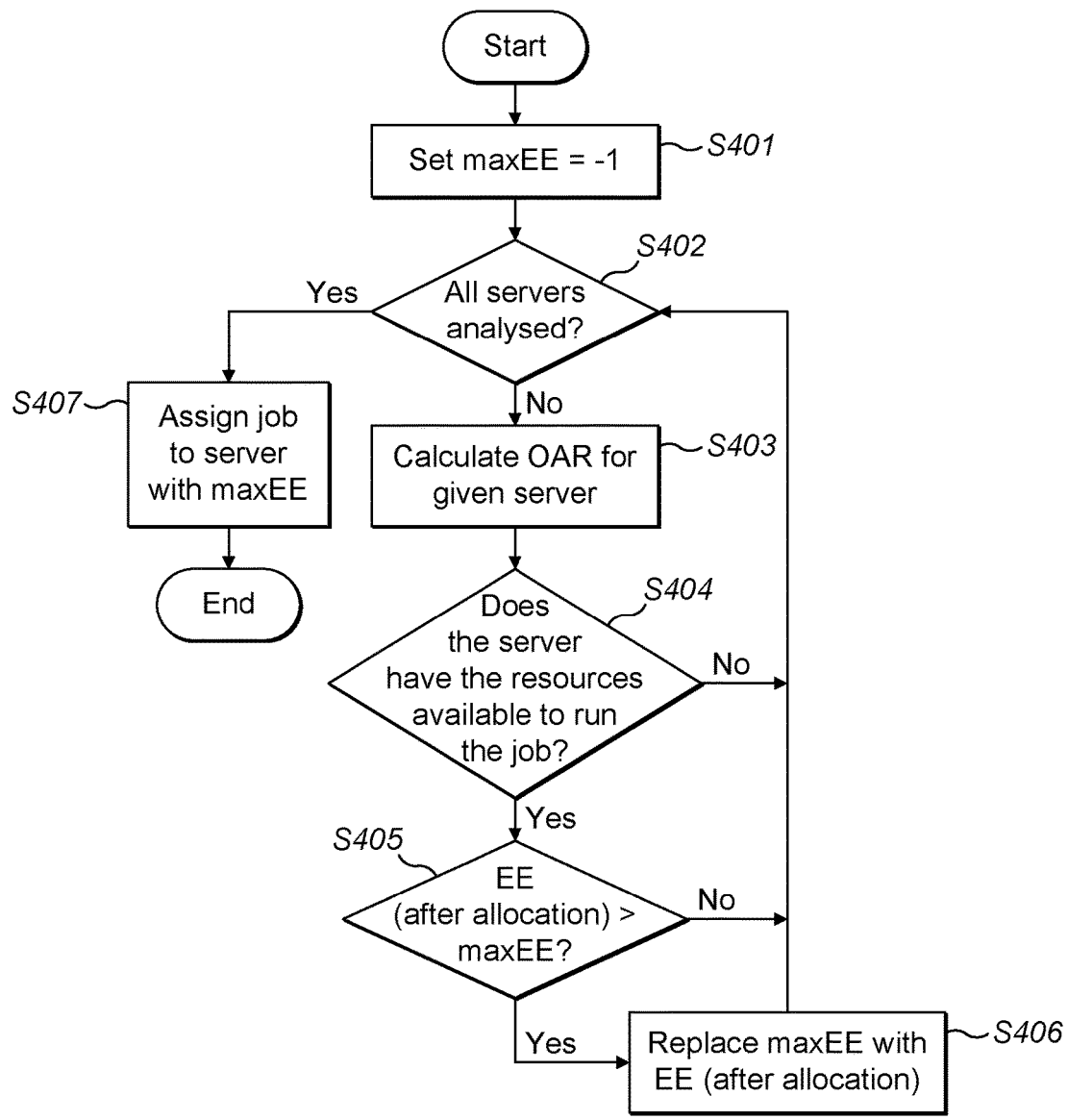
FIG. 4 is a flowchart detailing a method of allocating a job to a server according to an exemplary embodiment.

The OAPS 34 calculates the OAR for each server 2 in the datacentre 1, as shown in the flowchart of FIG. 4.

Firstly, in step 401, the value representing the maximum EE(afterAllocation), referred to as maxEE, is set to −1.

For every server 2 in the datacentre 1, the OAR is calculated (S403). The OAR is calculated using the method shown in FIG. 3 and b, and described above.

If the server 2 does not have the available resources in view of the calculated OAR to take the job, the method moves on to the next server 2 in the datacentre 1 (S404). The availability of the resources of the server 2 may be established by the DSM 35.

If, on the other hand, the server 2 has the available resources, a determination is made as to whether the EE(afterAllocation) is greater than the presently stored maxEE (S405).

If EE(afterAllocation) is less than or equal to maxEE, the method moves on to the next server 2. If EE(afterAllocation) is greater than maxEE then the presently stored maxEE is replaced by the value of EE(afterAllocation) before moving on to the next server 2 (S406).

When all servers 2 have been analysed (S402), the server 2 corresponding to the maxEE is allocated the job (S407)

Thereby, the server 2 having the resources available to execute the job and the maximum EE(afterAllocation) is allocated the job.

Accordingly, the OAPS 34 is able to allocate a job to the server 2 in a manner which saves datacentre energy consumption, and which also takes into account both the tendency of users 4 to overestimate the resources required by a job and the performance interference caused by competing jobs.

Furthermore, the OAPS 34 is able to calculate an OAR for each server 2 in the datacentre 2, which reflects user resource overestimation.

The OAPS 34 provides the identity of the server 2 to be allocated the job to the COS 32. The COS 32 then provides the identity of the server 2 to the CMS 3, which executes the job on the server 2.

Returning to FIG. 1*b*, the CMS 3 may further comprise an overload manager (OM) 80. The OM 80 is responsible for detecting and mitigating the occurrence of overload events.

An overload event occurs when the amount of required resources is in excess of the physical limit of the resources on a given server 2.

The OM 80 receives data from each server 2 in the datacentre 1. The data comprises information about the resource consumption of co-located workloads, and may be collected by a monitor (not shown), such as Libvirt API.

The OM 80 then uses this data to determine which, if any, of the servers 2 are in overload. Overloads are then stopped by the OM 80 by repeatedly removing those jobs with the lowest priority. If more than one job has the same priority, the job with the shortest running time is evicted.

Figure 5:
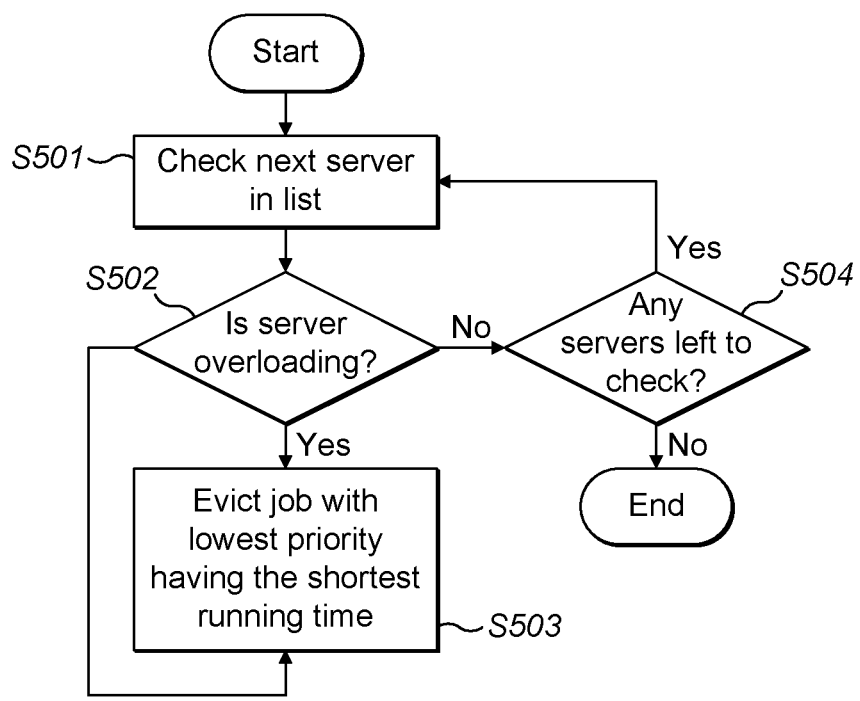
FIG. 5 is a flowchart showing a method of resolving overload events according to an exemplary embodiment.

A method of resolving overload events is described with reference to FIG. 5.

The OM 80 may iterate through a list of servers 2 in the datacentre 1. In step S501, the procedure of checking the next server on the list begins.

In step S502, a determination is made as to whether the server being checked is experiencing an overload event.

If the server is overloading, the job with the lowest priority and the shortest running time is evicted from the server (S503).

If the server is still in overload, the process is repeated until the overload is stopped.

When the overload is stopped, the OM 80 moves to the next server in the list and begins the checking procedure. If there are no more servers left to check, the process ends (S504).

Those jobs that are evicted by the OM 80 may be re-sent to the ICAO 30 for re-allocation.

It will be understood by one skilled in the art that jobs identified by the OM 80 may instead be paused or migrated.

The OM 80 may be executed periodically, and need only interact with the virtual infrastructure manager 60 and the plurality of servers 2 to execute the required evictions.

The above described systems and methods may advantageously allow a datacentre 1 to overcome the overestimation of required resources by users 4 by overallocating the capacity of physical servers 2.

Advantageously, the systems and methods may allow the overallocation rate to be calculated for each server 2 in the datacentre 1, rather than a single rate applied to each server 2 in the whole datacentre 1.

Additionally, the overallocation rate may reflect the overallocation patterns of the users 4 of the datacentre 1. The overallocation rate may also reflect the performance interference caused by the number and type of jobs running on a server 2. The overallocation rate may also consider the energy efficiency of the allocations made, thereby facilitating a more energy efficient datacentre 1.

Advantageously, an overload manager 37 may resolve overload events caused by erroneous overallocation, thereby improving the performance of a datacentre 1.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality.

In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of controlling a datacentre comprising a plurality of servers to execute a plurality of jobs, the method comprising:
   receiving a request to execute a job from a user;
   determining an allocated server on which to execute the job; and
   executing the job on the allocated server,
   wherein the determining comprises:
   (i) classifying the job according to its resource requirement;
   (ii) selecting a subset of the servers that fulfil the resource requirements of the job; and
   (iii) from the selected subset, determining as the allocated server a server that can execute the job with a favourable energy efficiency, said determining the server from the selected subset that can execute the job with a favourable energy efficiency includes:
      calculating an overallocation rate, OAR, of each server in the subset of servers;
      determining if each server in the subset has available resources to execute the job given the calculated OAR;
      determining the estimated energy efficiency of each server in the subset if the job is assigned to the server; and
      assigning the server in the subset which has available resources and a highest estimated energy efficiency to be the allocated server; and
   wherein a total resource estimate for all jobs running on a server in the plurality from time to time exceeds the resources of at least one of the servers in the plurality.

2. The method of claim 1, wherein the calculating the OAR comprises:
   calculating an overselling profit rate (P) of the server;
   establishing a category of the user;
   calculating the OAR from a statistical distribution describing overestimation patterns of the category of the user, using the overselling profit rate (P).

3. The method of claim 2, wherein the overselling profit rate is calculated according to the formula:

$$P = \frac{R}{R+C}$$

wherein R is a difference in energy efficiency (EE) caused by allocating the job to the server, and
   wherein C is the EE after allocation multiplied by the estimated change in EE.

4. The method of claim 3, wherein the estimated change in EE is calculated using an estimated performance interference.

5. The method of claim 4, wherein the estimated performance interference is an estimated aggregate of a performance interference produced by the plurality of jobs co-located on the server, based on a class of each job located on the server.

6. The method of claim 1, wherein the classifying the job comprises:
   training a decision tree classifier on a training set of historical tracelog data;
   classifying the job with the decision tree classifier.

7. The method of claim 1, wherein the selecting the subset of the servers comprises:
   calculating a similarity level between a set of server features (F) and a set of job constraints (C), and
   selecting the servers having the similarity level equal to or greater than a predetermined minimum similarity value.

8. The method of claim 1, wherein the method further comprises:
   detecting an overload event in at least one of the plurality of servers;
   resolving the detected overload event by evicting, pausing or migrating jobs having a lowest priority and a shortest running time.

9. A computer management system, CMS, for managing a computer datacentre comprising a plurality of servers, each comprising at least one virtual container, VC, the CMS comprising:
   one or more processors; and
   memory with computer code instructions stored thereon, the one or more processors and the memory with the computer code instructions being configured to cause the CMS to:
   receive a request to execute a job from a user, to control the CMS to determine a server on which the job will be executed and to control the CMS to execute the job;
   classify the job according to its resource requirements;
   select a subset of servers which fulfil a set of constraints of the job;
   record the status of each server in the datacentre;
   communicate with the plurality of servers, and
   determine the server which can execute the job with a favourable energy efficiency from the subset of servers and a class of the job; calculate an overallocation rate, OAR, of each server in the subset of servers; determine if each server in the subset has available resources to execute the job given the OAR; and determine the estimated energy efficiency of each server in the subset if the job is assigned to the server.

10. The system of claim 9, wherein the one or more processors and the memory with the computer code instructions are further configured to cause the system to detect an overload event in at least one of the plurality of servers and resolve the detected overload event by evicting, pausing or migrating jobs having a lowest priority and a shortest running time.

11. The system of claim 9, wherein the one or more processors and the memory with the computer code instructions are further configured to cause the system to:
   establish a category of a user and determine a statistical distribution describing overestimation patterns of the category of the user.

12. The system of claim 11, wherein the one or more processors and the memory with the computer code instructions are further configured to cause the system to:
   calculate an overselling profit rate (P) of the server; and
   calculate the OAR from the statistical distribution describing overestimation patterns of the category of the user, using the overselling profit rate (P).

13. The system of claim 12, wherein the one or more processors and the memory with the computer code instructions are further configured to cause the system to calculate the overselling profit rate according to the formula:

$$P = \frac{R}{R+C}$$

wherein R is a difference in energy efficiency (EE) caused by allocating the job to the server, and
wherein C is the EE after allocation multiplied by the estimated change in EE.

14. The system of claim 9, wherein, in selecting a subset of servers which fulfil a set of constraints of the job, the one or more processors and the memory with the computer code instructions are further configured to cause the system to:
   calculate a similarity level between a set of server features (F) and a set of job constraints (C), and
   select the servers having the similarity level equal to or greater than a predetermined minimum similarity value.

15. A computer datacentre comprising:
   a plurality of servers, each comprising at least one virtual container, VC, wherein the computer datacentre incorporates a computer management system, CMS, as claimed in claim 9.

16. A non-transitory computer-readable storage medium comprising:
   computer-executable components which when executed cause a computing device to perform the method of claim 1.

* * * * *